United States Patent
Brunnett et al.

(10) Patent No.: US 9,093,095 B2
(45) Date of Patent: Jul. 28, 2015

(54) ELECTRONIC SYSTEM WITH MEDIA PREPARATION MECHANISM AND METHOD OF OPERATION THEREOF

(71) Applicant: Western Digital Technologies, Inc., Irvine, CA (US)

(72) Inventors: Donald Brunnett, Pleasanton, CA (US); Kathy X. Tang, San Jose, CA (US); Jerry G. Le, Milpitas, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/137,418

(22) Filed: Dec. 20, 2013

(65) Prior Publication Data

US 2015/0109701 A1    Apr. 23, 2015

Related U.S. Application Data

(60) Provisional application No. 61/893,094, filed on Oct. 18, 2013.

(51) Int. Cl.
*G11B 21/02*    (2006.01)
*G11B 5/09*    (2006.01)
*G11B 5/56*    (2006.01)
*G11B 20/12*    (2006.01)
*G11B 5/60*    (2006.01)

(52) U.S. Cl.
CPC ............... *G11B 5/56* (2013.01); *G11B 5/6011* (2013.01); *G11B 20/1217* (2013.01); *G11B 5/6029* (2013.01); *G11B 5/6076* (2013.01)

(58) Field of Classification Search
None
See application file for complete search history.

(56) References Cited

U.S. PATENT DOCUMENTS

| | | | |
|---|---|---|---|
| 4,287,540 A | 9/1981 | Cheatham et al. | |
| 5,053,893 A | 10/1991 | Hayata et al. | |
| 6,185,063 B1* | 2/2001 | Cameron | 360/78.04 |
| 6,249,396 B1 | 6/2001 | Gray | |
| 6,351,340 B2 | 2/2002 | Dixon | |
| 6,771,441 B2 | 8/2004 | Tang et al. | |
| 6,906,880 B1 | 6/2005 | Codilian | |
| 7,319,569 B2 | 1/2008 | Kira | |
| 7,450,328 B2 | 11/2008 | Yang | |
| 7,768,729 B2 | 8/2010 | Moser et al. | |
| 7,920,351 B2 | 4/2011 | Cho et al. | |
| 8,094,401 B1 | 1/2012 | Peng et al. | |
| 2001/0031134 A1* | 10/2001 | Uchida et al. | 386/81 |
| 2005/0168869 A1 | 8/2005 | Dugas et al. | |
| 2013/0031406 A1* | 1/2013 | Cho | 714/6.1 |

* cited by examiner

*Primary Examiner* — Andrew L Sniezek

(57) ABSTRACT

An apparatus includes: a media; a head over the media; and control circuitry configured to cause the head to: write a first precondition track with a preconditioning pattern on the media, and write a data track on the media at a first inter-track spacing with the head positioned in a first direction from the first precondition track.

23 Claims, 4 Drawing Sheets

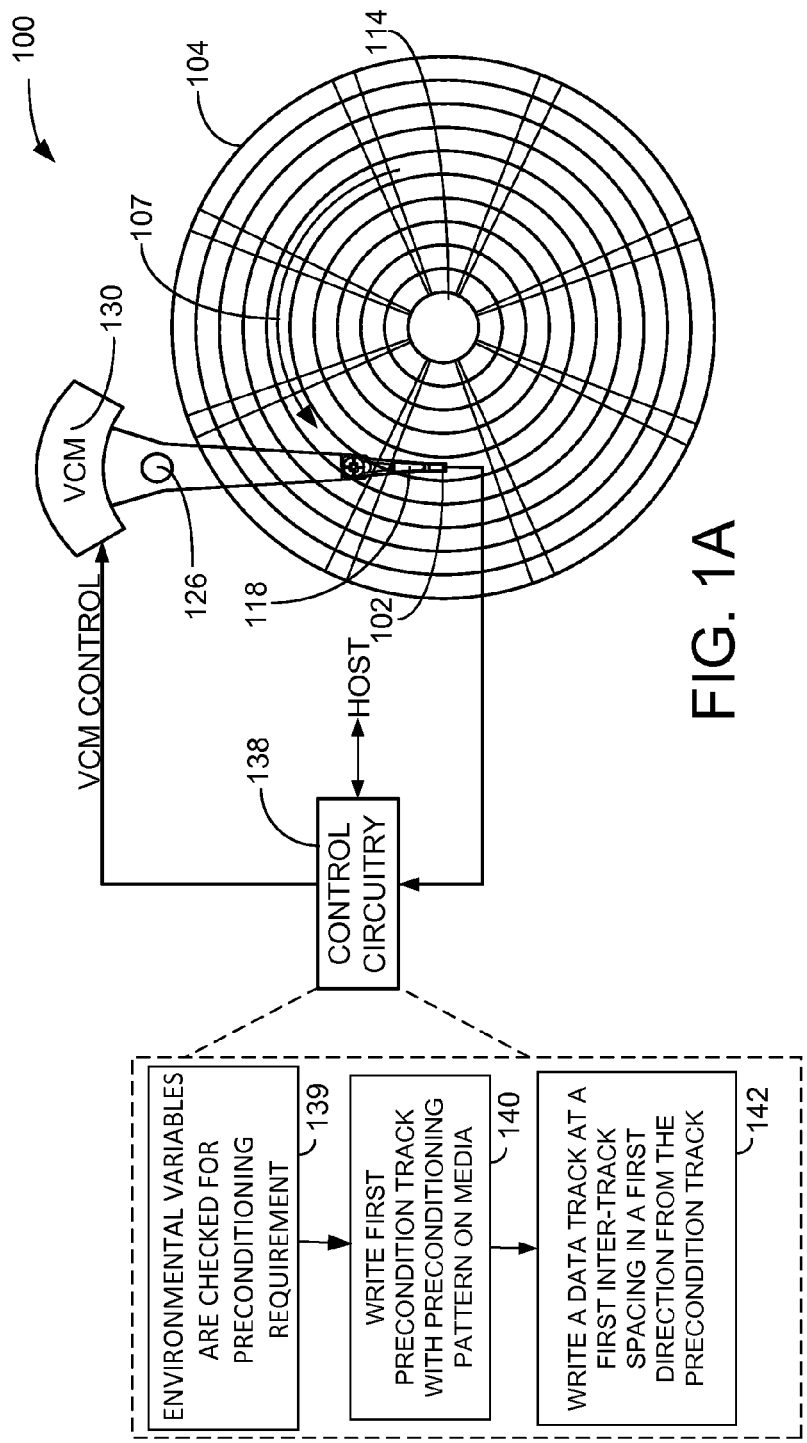
FIG. 1A
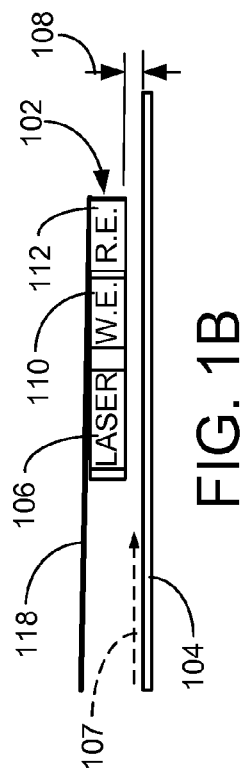
FIG. 1B
FIG. 1C

ELECTRONIC SYSTEM WITH MEDIA PREPARATION MECHANISM AND METHOD OF OPERATION THEREOF

CROSS-REFERENCE TO RELATED APPLICATION

This application claims the benefit of U.S. Provisional Patent Application Ser. No. 61/893,094 filed Oct. 18, 2013, and the subject matter thereof is incorporated herein by reference thereto.

TECHNICAL FIELD

An embodiment relates generally to an electronic system, and more particularly to a system for media preparation and use.

BACKGROUND

Modern consumer and industrial electronic devices require storage of information, such as digital photographs, videos, electronic mail, calendar, or contacts. These devices can be electronic systems, such as notebook computers, desktop computers, servers, televisions, and digital video recorders, and are providing increasing levels of functionality to support modern life. Research and development in the existing technologies can take a myriad of different directions.

As the volume of data stored in these electronic devices increases, hard disk drives (HDD) must have more data tracks and higher data frequencies must be accommodated. The closer the data tracks get to each other, the more crosstalk is possible as the magnetic recording can couple between tracks. In order to address the close proximity of the tracks, servo systems have been optimized to limit the variance of the head from track center.

The precision of writing the data track on the center of the intended track location can dramatically impact the ability to read the information back with minimum interference from the adjacent tracks. Previously written user data can also impact the ability to cleanly write an updated user data pattern on a selected track. All of these issues are magnified as the number of data tracks dramatically increases.

BRIEF DESCRIPTION OF THE DRAWINGS

FIGS. 1A, 1B, and 1C shows an operational diagram of an electronic system according to an embodiment.

DETAILED DESCRIPTION

Figure 2A:
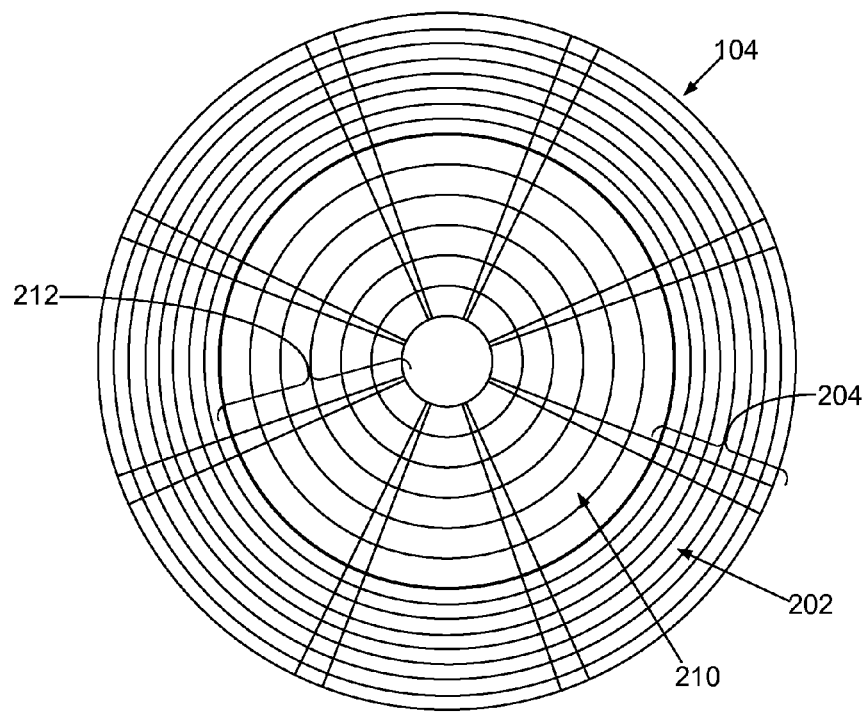
FIGS. 2A and 2B provide a geometrical representation of a media of the electronic system according to one embodiment.

A need still remains for an electronic system with media preparation mechanism for improving data performance when writing and reading the user data. The improved data performance can be provided by a reduction in the amplitude of the residual magnetic interference and controlling the frequency of residual magnetic interference for ease of filtering. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

Certain embodiments have other steps or elements in addition to or in place of those mentioned above. The steps or elements will become apparent to those skilled in the art from a reading of the following detailed description when taken with reference to the accompanying drawings.

The following embodiments are described in sufficient detail to enable those skilled in the art to make and use the embodiments. It is to be understood that other embodiments would be evident based on the present disclosure, and that system, process, or mechanical changes may be made without departing from the scope of an embodiment.

In the following description, numerous specific details are given to provide a thorough understanding of the embodiments. However, it will be apparent that the embodiments can be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, an embodiment can be operated in any orientation. The embodiments have been numbered first embodiment, second embodiment, etc. as a matter of descriptive convenience and are not intended to have any other significance or provide limitations for an embodiment. For reference purposes the data surface of the media is defined as being "horizontal" though it is understood that the electronic system can operate at any angle. Position of the head over the media is referred to as a "vertical" displacement or flying height.

Referring now to FIGS. 1A, 1B, and 1C, therein is shown an operational diagram of an electronic system 100 according to an embodiment. The electronic system 100 can represent an apparatus for one of the embodiments. An embodiment depicted in FIG. 1 is shown as a hard disk drive, as an example, although it is understood that the electronic system 100 as the embodiment can be a tape drive, a solid-state hybrid disk drive, or other magnetic media-based storage device. Further for example, the electronic system 100 can represent a desktop computer, a notebook computer, a server, a tablet, a television, a household appliance, or other electronic systems utilizing magnetic media storage.

The electronic system 100 including a head 102 actuated over a media 104. The head 102 can be mounted to a flex arm 118 attached to an actuator arm 122. The head 102 (FIG. 1B) can optionally include a laser 106 for heating the media 104 during part of a write process (e.g., the head is part of an Energy-Assisted Magnetic Recording (EAMR) drive). The flying height 108 can be adjusted (e.g., by use of a heater element in the head not shown in FIG. 1B) while writing data to the media 104 or as an error recovery process during reading from the media 104. Also in an embodiment of FIG. 1B, the head 102 comprises a write element 110 (e.g., an inductive coil) and a read element 112 (e.g., a magnetoresistive read element).

The media 104 is a structure for storing information. For example, the media 104 can be made of an aluminum alloy, ceramic/glass, or a similar non-magnetic material. The top and bottom surfaces of the media 104 can be covered with magnetic material deposited on one or both sides of the media 104 to form a coating layer capable of magnetization.

Any suitable version of the laser 106 can be employed in the embodiments, such as a laser diode. In addition, embodiments can employ any suitable techniques for focusing the laser on the media 104, such as a suitable waveguide, magnifying lens, or other suitable optics. The laser 106 is increased to a write power in order to heat the disk, thereby decreasing the coercivity of the media 104 so that the data is written more reliably.

The spindle motor 114 can rotate the media 104, about a center of the media 104, at constant or varying speed 107. For illustrative purposes, the spindle motor 114 is described as a motor for a rotation, although it is understood that the spindle motor 114 can be other actuating motors for a tape drive, as an example.

As examples, a motor assembly 130 can be a voice coil motor assembly, a stepper motor assembly, or a combination thereof. The motor assembly 130 can generate a torque for positioning the head 102.

A tapered end of the flex arm 118 can include the head 102. The flex arm 118 can be mounted to the actuator arm 122, which is pivoted around a bearing assembly 126 by the torque generated by the motor assembly 130. The head 102 can include a single instance of the write element 110 and a single instance of the read element 112 that is narrower than the write element 110. The head 102 can fly over the media 104 at a dynamically adjustable span of the flying height 108, which represents a vertical displacement between the head 102 and the media 104. The head 102 can be positioned by the flex arm 118 and the actuator arm 122 and can have the flying height 108 adjusted by control circuitry 138.

The head 102 can be positioned over the media 104 along an arc shaped path between an inner diameter of the media 104 and outer diameter of the media 104. For illustrative purposes, the actuator arm 122 and the motor assembly 130 are configured for rotary movement of the head 102. The actuator arm 122 and the motor assembly 130 can be configured to have a different movement. For example, the actuator arm 122 and the motor assembly 130 could be configured to have a linear movement resulting in the head 102 traveling along a radius of the media 104.

The head 102 can be positioned over the media 104 to create magnetic transitions or detect magnetic transitions from the coating layer that can be used to representing written data or read data, respectively. The position of the head 102 and the speed 107 of the media 104 can be controlled by the control circuitry 138. Examples of the control circuitry 138 can include a processor, an application specific integrated circuit (ASIC) an embedded processor, a microprocessor, a hardware control logic, a hardware finite state machine (FSM), a digital signal processor (DSP), digital circuitry, analog circuitry, optical circuitry, or a combination thereof. The control circuitry 138 can also include memory devices, such as a volatile memory, a nonvolatile memory, or a combination thereof. For example, the nonvolatile storage can be non-volatile random access memory (NVRAM) or Flash memory and a volatile storage can be static random access memory (SRAM) or dynamic random access memory (DRAM).

The control circuitry 138 can be configured to control the spindle motor 114 for adjusting the speed 107 of the media 104. The control circuitry 138 can be configured to cause the head 102 to move relative to the media 104, or vice versa. The control circuitry 138 can also be configured to control the flow of information to the head 102 for writing to the media 104. The information sent to the head 102 can include the preconditioning pattern, direct current erase signals, user data, or a combination thereof.

In one embodiment, the electronic system 100 further comprises control circuitry 138 configured to execute the flow diagram of FIG. 1C. In a block 139, environmental variables are checked for a preconditioning requirement. For example, a time constraint and/or an override flag, in the control circuitry 138, may be conditioned based on the environmental variable(s). The environmental variables can include the temperature, relative humidity, altitude, or flying height. Temperatures below 25 degrees Celsius can require preconditioning and can reset the override flag. In one embodiment, in block 140, a first precondition track can only be written, with a preconditioning pattern, on the media if the override flag is inactive. The override flag will be set if the environmental variables do not require the preconditioning or activity from the host prevents the delay required for the first precondition track. In block 142, a data track on the media is written at a first inter-track spacing with the head positioned in a first direction from the first precondition track. In some embodiments, the environmental variable check in block 139 may be optionally omitted so that the control circuitry 138 may execute blocks 140 and 142 without block 139. In such a case, the performance of the actions described in blocks 140 and 142 is not contingent upon the override flag. Additional details related to the flow diagram will be provided below in conjunction with FIGS. 2A-4.

Figure 2B:
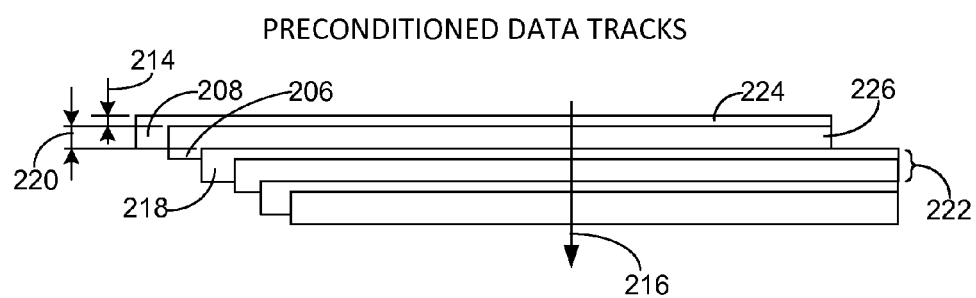

Referring now to FIGS. 2A and 2B, therein is shown a geometrical representation of a media 104 of the electronic system 100 of FIG. 1 according to an embodiment. In an embodiment shown in FIG. 2A, shingle data tracks 202 in the shingle zone 204 can be shingled by writing the shingle data tracks 202 in an overlapping manner. Overlapping the shingle data tracks 202 increases the radial density of the media 104, thereby increasing the capacity of the electronic system 100, as an example. The shingle data tracks 202 can be written as a circular pattern as illustrated in FIG. 2A, where the shingle data tracks 202 are written from the outer diameter toward the inner diameter (or vice versa). Non-overlapping tracks are written in a non-shingle zone 212 in an embodiment. While in this example the shingle zone 204 is depicted on the outer diameter relative to the non-shingle zone 212, the arrangement of the zones and the number of zones used may be different depending on implementation.

In one embodiment, frequently written logical block addresses (LBAs) can be written to the non-shingled data tracks 210 of a non-shingle zone 212 and infrequently written LBAs are written to the shingled shingle data tracks 202 of the shingle zone 204. This increases the overall capacity of the electronic system 100 since the radial density of the shingled shingle data tracks 202 can be significantly higher than the radial density of the non-shingled data tracks 210. The performance of the electronic system 100 is not significantly impacted by the clean-up process known as "garbage collection", which is performed on the shingle zone 204, since update writes occur at a lower frequency. The clean-up process can include an initialization of a number of the shingle data tracks 202 that require update and is performed by writing the preconditioning pattern across any residual information on the number of the shingle data tracks 202. Once the shingle data tracks 202 have been initialized, they are once again available for use.

In another embodiment, the lower radial density of the non-shingled data tracks 210 in the non-shingle zone 212 can increase performance by avoiding (or reducing) the need to perform write verify operations, whereas the higher radial density of the shingled shingle data tracks 202 in the non-shingle zone 212 can reduce performance due to a need to perform write verify operations. Storing data associated with infrequently written LBAs in the shingled shingle data tracks 202 of the shingle zone 204 reduces the frequency of corresponding write verify operations while increasing the overall capacity of the electronic system 100. Although FIG. 2A depicts a media with both a shingle and a non-shingle zone, in some embodiments the media may include all shingled tracks or all non-shingled tracks.

Figure 3:
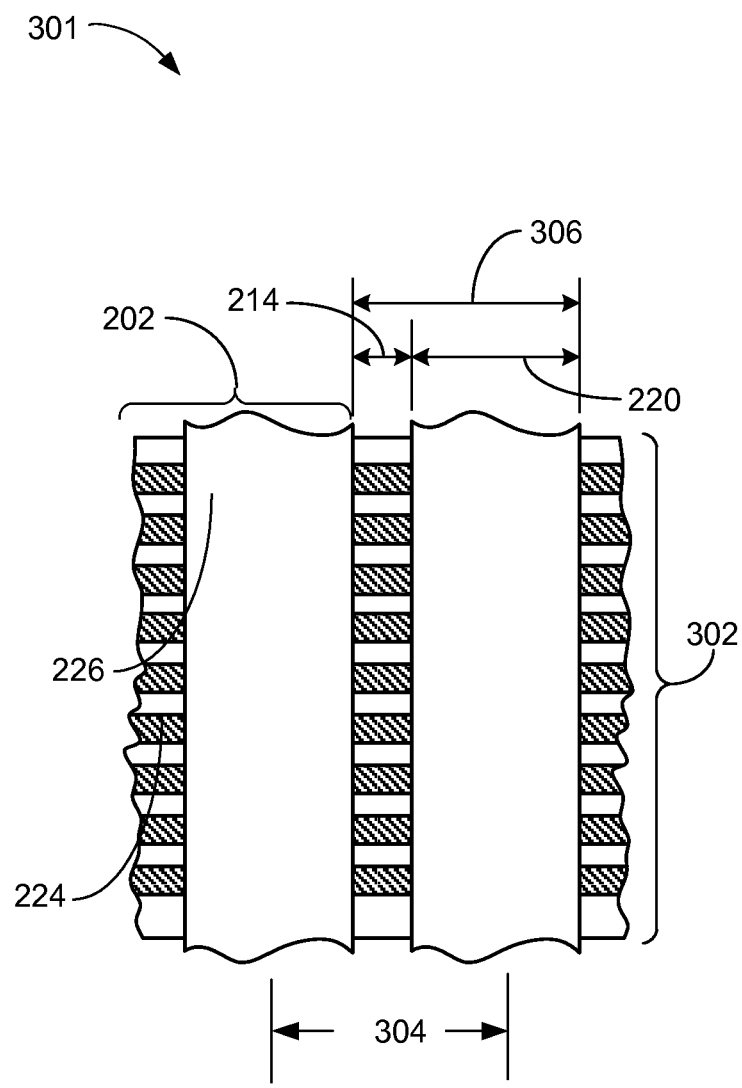
FIG. 3 is an example of preconditioned recording of the electronic system according to one embodiment.

FIG. 2B shows an example of writing precondition pattern with shingle tracks according to an embodiment. As shown in FIG. 2B, a first precondition track 208 can be written with a preconditioning pattern 302 as depicted in FIG. 3, such as a pattern having a period that is twice that of a data track 206. The extended period of the preconditioning pattern 302 of the first precondition track 208 can aid in the removal of preconditioning pattern 302 from the data read of the data track 208 during a subsequent operation. The data track 206 can be written by the control circuitry 138 of FIG. 1 positioning the head 102 of FIG. 1 at a first inter-track spacing 214 in a first direction 216 and magnetically coupling data (e.g., the user data 1 received from the host). By way of an example, the first inter-track spacing 214 can be a quarter-track width, a half-track width, or any other measure less than a full-track width. The first direction 216 can be any direction that the control circuitry 138 can be configured to move the head 102 relative to the media 104 or vice versa.

A second precondition track 218 can be written by the control circuitry 138 positioning the head 102 a second inter-track spacing 220, in the first direction 216, from the end of the first inter-track spacing 214 and magnetically coupling the preconditioning pattern 302. By way of an example, the second inter-track spacing 220 can be a quarter-track width, a half-track width, or any other measure less than a preconditioned data track 222 width.

The resultant pattern on the media 104 can be the preconditioned data track 222, which includes a preconditioned band 224, created to be the width of the first inter-track spacing 214, and a data portion 226, created to be the width of the second inter-track spacing 220. It is understood that the shingled shingle data tracks 202 can include multiple preconditioned data track 222 as an embodiment.

It has been discovered that the preconditioned data track 222 can be defined to optimize the ability to read back the data portion 226 by: (1) controlling the width of the preconditioned data track 222 to be the second inter-track spacing 220 and (2) providing the preconditioned band 224 with the preconditioning pattern 302 having the period that can be filtered from the returned signal when the preconditioned data track 222 is read. The adjustment of the first inter-track spacing 214 and the second inter-track spacing 220 can accommodate an increase in data handling reliability by cancelling out residual magnetic signature from previously written patterns on the media 104. By preconditioning the shingled shingle data tracks 202 with the preconditioning pattern 302, of a fixed frequency, in an embodiment it is possible to filter the preconditioning pattern 302 from the user data 144 thereby increasing the error margin by 0.1-0.2 dB and the off-track read capability by 1-2%. This process can allow increased reduction in the overall width of the preconditioned data track 222, an increase in margin for utilization of weaker versions of the head 102, or a combination thereof.

As described above, the precondition pattern 302 may be written as part of a normal write operation for some or all of the tracks. In an embodiment, the precondition writing scheme may be selectively turned on, based on, for example, the location of the writing, a quality metric of the media to which data is being written, environmental factors observed (e.g., temperature, altitude), etc. An in-field decision process 139 can be used to determine if the writing of the precondition pattern 302 is required for reliable operation of the electronic system 100. The parametric information of the electronic system 100 can include the flying height of the head 102, current temperature, the number of correctable read errors in the area of the target logical block address, or a combination thereof. Such parametric information may be used to determine whether preconditioning should be performed at one or more tracks. In an example embodiment, based on the parametric information, an override flag, in the control circuitry 138, is conditioned to enable the preconditioning. Due to the additional time required to write the precondition pattern 302, a backlog of pending interface operations can overrule the need for the write of the precondition pattern 302. If the decision to skip the writing of the precondition pattern 302 is based on the activity of the interface the override flag can be set. The logical block address can be flagged for re-write with the precondition pattern 302 during a garbage collection process.

In addition, during a manufacturing process, the electronic system 100 can be used to initialize all of the shingle data tracks 202 and the non-shingled data tracks 210. During the initialization process, some or all of the shingle data tracks 202 and the non-shingled data tracks 210 may be written with the preconditioning pattern 302. In an embodiment, as part of some background processes in the field of use (e.g., garbage collection and/or data recovery processes), zones of tracks or individual tracks can be initialized by filling the zones of tracks or individual tracks with the preconditioning pattern 302 as previously described.

Referring now to FIG. 3, therein is shown a preconditioned recording 301 of the electronic system 100 according to an embodiment. The preconditioned recording 301 depicts two adjacent instances of the shingle data track 202 written onto the media 104 of FIG. 1. The quality of recording process depends on the previous recorded pattern (old information) and the ability of the head 102 of FIG. 1 to magnetically overwrite the previous recorded pattern. Overwriting can be challenging with the reduction of width of the head 102, especially at cold temperatures. One embodiment can prepare the media 104 of FIG. 1 and the shingle data track 202 by removing old information with a write of a preconditioning pattern 302 with the same head 102 to improve the quality of writing the user data 144 of FIG. 1 and gain performance for the electronic system 100, in this example a hard disk drive.

It is understood that the preconditioning pattern 302 shown in FIG. 3 is an alternating current pattern demonstrated by the shaded and un-shaded pattern. This is an example only and any previously selected pattern can be used. The selection of the alternating current pattern at a previously selected frequency allows a notch filter, sensitive to the previously selected frequency, to be applied to remove the preconditioning pattern 302 as part of the read signal processing.

In shingled magnetic recording (SMR) recording, the width of the head 102 can be much wider than a track pitch 304, which measures the spacing between centerlines of the shingle data tracks 202 on the media 104. The write precondition in one embodiment can optimize write process and overwrite process separately and control edge write quality for the head 102, such as the shingled magnetic recording head. It is understood that an embodiment can also be operated with the head 102 that is a conventional magnetic recording (CMR) head without changing any of the concepts.

It has been discovered that some embodiments improve user data 144 writing quality and gain HDD performance by write preconditioning. The adjustment of the first inter-track spacing 214 and the second inter-track spacing 220 can accommodate an increase in data reliability by cancelling out any residual magnetic signature from previously written patterns on the media 104. By preconditioning the media 104 with a previously selected pattern of a fixed frequency it is possible to filter the preconditioning pattern 302 from the user data with minimal impact to the hardware design. This process can allow increased reduction in a data track width 306, an increase in margin for utilization of weaker versions of the head 102, or a combination thereof.

Some embodiments prepare the media 104 with a background that gives a better data write quality. The preconditioning pattern 302 can be an alternating current pattern or a direct current pattern written with the same amplitude as the data track 206. In an embodiment, the preconditioning pattern 302 is written by the single write transducer of the head 102. The head 102 can be adjusted to have a different flying height while writing the preconditioning pattern 302 than when writing the data track 206. The change in the flying height 108 of FIG. 1 of the head 102 can further enhance the ability to filter the effects of the preconditioned band 224 during a subsequent read operation.

It has been discovered that, in one embodiment, the electronic system 100 provides a 0.1-0.2 dB increase in the error margin when reading the data portion 226 and a 1-2% increase in the off-track read capability. The adjustment of the first inter-track spacing 214 and the second inter-track spacing 220 can accommodate an increase in data handling reliability by cancelling out any residual magnetic signature from previously written patterns on the media 104. By preconditioning the shingled shingle data tracks 202 with a known pattern of a fixed frequency it is possible to filter the preconditioning pattern 302 from the user data read from the preconditioned data track 222 thereby increasing the error margin and the off-track read capability.

Figure 4:
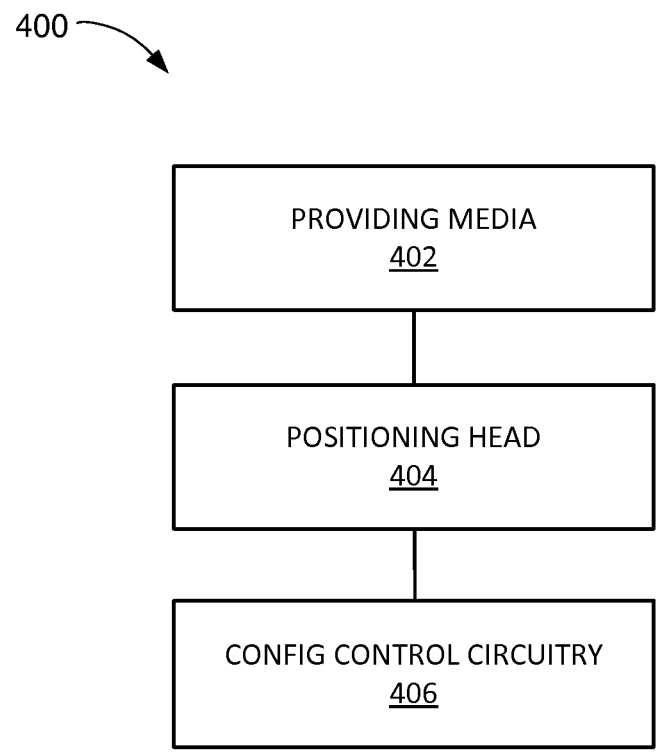
FIG. 4 is a flow chart of a method of operation of an electronic system in an embodiment.

Referring now to FIG. 4, therein is shown a flow chart of a method 400 of operation of an electronic system 100 in an embodiment. The method 400 includes: providing a media in a block 402; positioning a head over the media in a block 404; and w configuring a control circuitry includes preparing the head for: writing a first precondition track with a preconditioning pattern on the media, and writing a preconditioned data track on the media at a first inter-track spacing with the head positioned in a first direction from the first precondition track by coupling the preconditioning pattern through the head for displaying on a device in a block 406.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment is that it valuably supports and services the historical trend of reducing costs, simplifying systems, and increasing performance.

These and other valuable aspects of an embodiment consequently further the state of the technology to at least the next level.

While the embodiments have been described in conjunction with a specific detailed description, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An apparatus comprising:
   a media;
   a head positioned over the media; and
   control circuitry configured to cause a flying height of the head to be adjusted and to cause the head to:
      write a first precondition track with a preconditioning pattern on the media the preconditioning pattern written at a flying height that is different from the flying height of the head for writing a data track, and
      write the data track on the media at a first inter-track spacing with the head positioned in a first direction from the first precondition track.

2. The apparatus as claimed in claim 1 wherein the control circuitry is further configured to position the head in the first direction by the first inter-track spacing that is less than a data track width.

3. The apparatus as claimed in claim 1 wherein the control circuitry is further configured to cause the head to write a second precondition track on the media at a second inter-track spacing with the head positioned in the first direction from the first inter-track spacing.

4. The apparatus as claimed in claim 1 wherein the control circuitry is further configured to cause the head to form a preconditioned band on the media by the data track written on a portion of the first precondition track.

5. The apparatus as claimed in claim 1 wherein the head includes one of: a shingled magnetic recording (SMR) head and a conventional magnetic recording (CMR) head.

6. The apparatus as claimed in claim 1 wherein the head, including a write transducer, is wider than a data track width.

7. A method of manufacturing an apparatus, the method comprising:
   providing a media;
   positioning a head over the media; and
   configuring a control circuitry includes preparing the head for:
      writing a first precondition track with a preconditioning pattern on the media the preconditioning pattern including an alternating current (AC) pattern, and
      writing a preconditioned data track on the media at a first inter-track spacing with the head positioned in a first direction from the first precondition track by coupling the preconditioning pattern through the head.

8. The method as claimed in claim 7 wherein writing the preconditioned data track on the media at the first inter-track spacing includes moving the head less than a data track width.

9. The method as claimed in claim 7 further comprising:
   writing a second precondition track on the media with the head positioned at a second inter-track spacing in the first direction from the first inter-track spacing; and
   coupling the preconditioning pattern through a single write transducer of the head.

10. The method as claimed in claim 7 wherein writing the preconditioned data track includes forming a preconditioned band on a portion of the first precondition track.

11. The method as claimed in claim 7 wherein writing the first precondition track includes writing the first precondition track wider than a data track width.

12. The method as claimed in claim 7 wherein the head comprises one of: a shingled magnetic recording (SMR) head and a conventional magnetic recording (CMR) head.

13. A method of operating an apparatus, the method comprising:
- positioning a head over a media;
- adjusting a flying height of the head for writing a preconditioning pattern at a flying height that is different from the flying height of the head for writing user data;
- writing a first precondition track with the preconditioning pattern on the media; and
- writing a data track on the media with the user data at a first inter-track spacing in a first direction from the first precondition track.

14. The method as claimed in claim 13 writing the data track includes moving the head less than a data track width.

15. The method as claimed in claim 13 further comprising writing a second preconditioned track on the media with the head positioned at a second inter-track spacing in the first direction from the first inter-track spacing and coupling the preconditioning pattern through a single write transducer of the head.

16. The method as claimed in claim 13 wherein writing the data track includes forming a preconditioned band on a portion of the first precondition track.

17. The method as claimed in claim 13 wherein writing the first precondition track includes writing the first precondition track wider than a data track width.

18. The method as claimed in claim 13 wherein writing the first precondition track with the preconditioning pattern includes writing an alternating current (AC) pattern.

19. A method of operating an apparatus, the method comprising:
- determining, based on an environmental variable related to the apparatus, whether to precondition a media in the apparatus; and
- in response to determining that preconditioning of the media should be performed:
  - positioning a head over the media which includes adjusting a flying height of the head for writing a preconditioning pattern at a flying height that is different from the flying height of the head for writing user data,
  - writing a first precondition track with the preconditioning pattern on the media, and
  - writing a data track on the media with the user data at a first inter-track spacing in a first direction from the first precondition track.

20. The method as claimed in claim 19 wherein determining whether to precondition the media includes examining an override flag, conditioned based on the environmental variable, for controlling the precondition.

21. The method as claimed in claim 20 wherein examining the override flag, conditioned based on the environmental variable, includes preventing writing the first precondition track based on the condition of the override flag being set.

22. The method as claimed in claim 20 wherein examining the override flag, conditioned based on the environmental variable, includes allowing writing the first precondition track based on the condition of the override flag being reset.

23. The method as claimed in claim 19 wherein the environmental variable related to the apparatus comprises one of more of: the flying height, a current temperature, an altitude, or a relative humidity.

\* \* \* \* \*